United States Patent [19]

Josendal

[11] 4,393,936
[45] Jul. 19, 1983

[54] METHOD FOR THE ENHANCED RECOVERY OF OIL AND NATURAL GAS

[75] Inventor: Virgil A. Josendal, Pomona, Calif.

[73] Assignee: Union Oil Company of California, Brea, Calif.

[21] Appl. No.: 303,957

[22] Filed: Sep. 21, 1981

[51] Int. Cl.³ .......................................... E21B 43/22
[52] U.S. Cl. ................................. 166/263; 166/268; 166/223; 166/274
[58] Field of Search ............... 166/263, 268, 269, 266, 166/267, 273, 274, 305 R

[56] References Cited

U.S. PATENT DOCUMENTS

| 1,899,497 | 2/1933 | Doherty | 166/268 |
| 2,548,059 | 4/1951 | Ramsey | 166/263 X |
| 2,623,596 | 12/1952 | Whorton et al. | 166/266 X |
| 2,828,819 | 4/1958 | Hughes | 166/268 X |
| 2,842,204 | 7/1958 | Horner | 166/268 |
| 2,885,003 | 5/1959 | Lindauer, Jr. | |
| 3,111,987 | 11/1963 | Orkiszewski | |
| 3,131,760 | 5/1964 | Arendt et al. | 166/268 |
| 3,138,202 | 6/1964 | Ewing et al. | |
| 3,150,716 | 9/1964 | Strelzoff et al. | |
| 3,163,215 | 12/1964 | Stratton | |
| 3,174,543 | 3/1965 | Sharp | |
| 3,193,006 | 7/1965 | Lewis | |
| 3,203,481 | 8/1965 | Dew et al. | 166/273 |
| 3,215,198 | 11/1965 | Willman | |
| 3,312,278 | 4/1967 | Warden | |
| 3,467,191 | 9/1969 | Van Daalen et al. | 166/269 |
| 3,476,185 | 11/1969 | Cornelius | 166/274 |
| 3,519,076 | 7/1970 | Walker | 166/263 |
| 3,653,438 | 4/1972 | Wagner | 166/266 |
| 3,680,633 | 8/1972 | Bennett | 166/256 |
| 3,809,159 | 5/1974 | Young et al. | 166/258 |
| 3,811,502 | 5/1974 | Burnett | 166/273 |
| 3,964,545 | 6/1976 | Speller, Jr. | 166/268 X |
| 4,042,029 | 8/1977 | Offeringa | 166/272 |

FOREIGN PATENT DOCUMENTS 443163  6/1975  U.S.S.R. .............................. 166/263

Primary Examiner—Stephen J. Novosad
Assistant Examiner—George A. Suchfield
Attorney, Agent, or Firm—Alan H. Thompson; Daniel R. Farrell; Dean Sandford

[57] ABSTRACT

A method for the enhanced recovery of both natural gas and liquid petroleum from hydrocarbon-containing subterranean formations, particularly dipping subterranean formations, by the consecutive steps of introducing a gaseous displacement fluid to recover natural gas and thereafter introducing an oil-miscible displacement fluid to recover undrained oil and/or other liquid petroleum.

28 Claims, 1 Drawing Figure

METHOD FOR THE ENHANCED RECOVERY OF OIL AND NATURAL GAS

BACKGROUND OF THE INVENTION

1. Field of the Invention

This invention relates to a method of recovering hydrocarbons from hydrocarbon-containing subterranean formations, and more particularly to methods for enhancing the recovery of both oil and natural gas from formations having a natural gas-containing zone overlying a liquid petroleum-containing zone.

2. Description of the Prior Art

Primary oil recovery is usually achieved by penetrating an oil-bearing earth formation with a plurality of wells and recovering the oil from these wells by means of the natural fluid pressure in the subterranean earth formation. In order to recover additional oil, various secondary and/or tertiary enhanced oil recovery techniques have been proposed and some of these techniques have been used commercially. For example, water flooding has been somewhat successful in recovering secondary oil from oil-bearing formations. One of the more promising enhanced oil recovery techniques involves the injection of an oil-miscible fluid, such as carbon dioxide ($CO_2$), to increase oil recovery. In this process, the oil-miscible fluid is pumped into the formation under sufficient pressure so that it becomes miscible with oil, typically swelling the oil, decreasing its viscosity and lowering its interfacial tension. This swelling and reduction of the viscosity and interfacial tension of the oil tends to increase its mobility so as to facilitate its recovery from the oil-bearing formation.

Various methods have also been proposed to enhance the recovery of natural gas from natural gas-containing subterranean formations, such as by the displacement of the natural gas by a less valuable gas, such as nitrogen.

Some subterranean formations have an upper zone containing natural gas (or "gas cap") overlying a liquid-petroleum-bearing zone. A partially depleted liquid petroleum-containing formation may contain a significant amount of liquid petroleum (or "undrained oil") in the gas cap. This region of coexisting gas and undrained oil can result when either a primary gas cap has been allowed to expand in size or a secondary gas cap has been created by gas injection to encompass what had formerly been a liquid petroleum-containing zone. In view of the fluctuating relative values of natural gas and liquid petroleum, it has been the practice to recover the more valuable fluid from such reservoirs, often at the expense of reducing the ultimate recovery of the other fluid. For example, natural gas may be rapidly produced with the result that a natural water drive may invade the liquid petroleum-containing zone and effect a reduction in the amount of oil ultimately recoverable from that zone. Thus, a need exists for a method to enhance the recovery of both natural gas and liquid petroleum from such formations.

It is therefore an object of this invention to provide a process for recovering both natural gas and liquid petroleum from a subterranean hydrocarbon-containing formation.

It is a further object of this invention to provide a method for recovery of both natural gas and liquid petroleum from such formations while minimizing the expense of such recovery by utilizing inexpensive displacement fluids.

Another object of this invention is to provide a method for recovery of both natural gas and liquid petroleum which makes maximum advantage of any fluid density differences between the injected and connate fluids in order to minimize the adverse-gravity driven dispersion which might otherwise reduce the rate of hydrocarbon recovery.

Further objects, advantages and features of the invention will become apparent to those skilled in the art from the following description when taken in conjunction with the accompanying drawing.

SUMMARY OF THE INVENTION

Briefly, the invention provides a method in which a gaseous displacement fluid is introduced into a natural gas-bearing zone overlying a liquid petroleum-containing zone of a subterranean formation so as to displace the natural gas to a production well for recovery and thereafter an oil-miscible displacement fluid is introduced to miscibly displace undrained oil and/or other liquid petroleum from the subterranean formation. Preferably, relatively inexpensive injection fluids, such as nitrogen and carbon dioxide, are employed.

In one preferred embodiment of the method of this invention, nitrogen is introduced into the formation at one or more points near the interface between the natural gas-bearing zone and underlying liquid petroleum-bearing zone so as to displace the natural gas upwardly through the natural gas-bearing zone to an updip recovery well. Thereafter, carbon dioxide is introduced near the top of the natural gas-bearing zone under conditions selected to form a miscible transition fluid of the carbon dioxide and the undrained oil. The miscible transition fluid is then driven downwardly to displace liquid petroleum to a downdip well for recovery.

The method of this invention provides for the enhanced recovery of each of natural gas and liquid petroleum without adversely affecting, or at least minimizing the adverse effects on, the enhanced recovery of the other. The method of this invention allows the density differences between connate and injected fluids to be used to great advantage while avoiding adverse gravitationally driven dispersion effects. And the method of the invention allows the use of relatively inexpensive displacement fluids, such as nitrogen, for natural gas recovery while avoiding the known adverse effects of the use of such fluids on liquid petroleum recovery.

BRIEF DESCRIPTION OF THE DRAWING

The invention will be readily understood by reference to the drawing which is a cross-sectional view of a hydrocarbon-containing subterranean formation to which the method of the invention would be applicable.

DETAILED DESCRIPTION OF THE INVENTION

Figure 1:
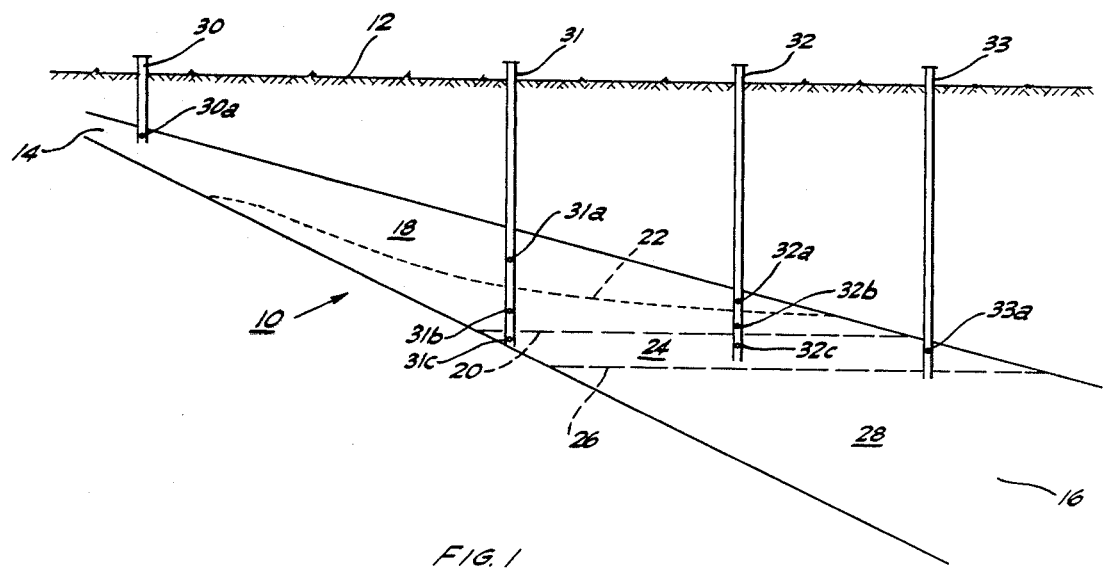

The method of this invention is applicable to a wide variety of subterranean hydrocarbon-containing formations having a natural gas-containing zone overlying a liquid petroleum-containing zone. While the invention will be described with respect to a dipping formation having an uppermost natural gas-containing first zone overlying a liquid petroleum-containing second zone and a bottom-most third zone containing natural ground water, the invention is not so limited.

Referring to the drawing, a dipping subterranean formation shown generally as 10, underlies earth surface 12 at varying depths which increase from an uppermost extension (indicated as 14) of formation 10 to a lowermost extension (indicated as 16) of formation 10. Within formation 10, there exist three zones characterized by the type of fluids contained therein. Uppermost first zone 18, defined by the area within formation 10 between uppermost extension 14 and dashed line 20, contains natural gas, and in some cases undrained oil (the upper level at which higher oil saturations exist is represented by dotted line 22). As used herein the term "undrained oil" means that portion of liquid petroleum which is retained in a subterranean formation after a major portion of liquid petroleum has been displaced from the formation by a lighter density fluid, such as may occur during a pressure maintenance program when a liquid petroleum-containing formation is employed for seasonal storage of natural gas, and which has not yet drained or is in the process of draining by gravity into a lower zone of the formation. In the upper regions of first zone 18 (usually above dotted line 22) are generally found relatively low saturations of undrained oil and relatively high saturations of natural gas. Conversely, in the lower regions of first zone 18 are found relatively high saturations of undrained oil and relatively low saturations of natural gas. Second zone 24, defined by the area within formation 10 between dash lines 20 and 26, contains primarily liquid petroleum and naturally attendant amounts of dissolved natural gas, water and the like. Lowermost third zone 28, defined by the area within formation 10 between dash lines 26 and lowermost extension 16, contains primarily ground water although it may contain amounts of residual liquid petroleum or the like.

Wells 30, 31, 32 and 33 penetrate from earth surface 12 into formation 10 so as to be in fluid communication with the various zones. Well 30 is in fluid communication with first zone 18 through perforations 30a at a point near the uppermost extension 14. Well 31 is in fluid communication with first zone 18 through perforations 31a and 32b, and, optionally, with second zone 24 through perforations 31c, all of perforations 31a, 31b and 31c being a lower elevation than perforations 30a. Well 32 is in fluid communication with first zone 18 through perforations 32a and 32b at about the interface of zones 18 and 24, and with second zone 24 through perforations 32c. Well 33 is in fluid communication with second zone 24 through perforations 33a. Well 30, 31, 32, and 33 contain suitable well hardware in order that they can be used for fluid communication with any one or more of uppermost first zone 18, and/or second zone 24.

In the method of this invention, the gaseous displacement fluid is injected into first zone 18 to displace natural gas from first zone 18 for recovery through a recovery well. As used herein, the term "gaseous displacement fluid" means a fluid which will not miscibly displace the connate liquid petroleum under the temperature and pressure conditions existing in the formation during the use of the method of this invention. A wide variety of gaseous displacement fluids may be used in this invention. Suitable gaseous displacement fluids include flue gas, nitrogen, air and other nitrogen-containing gases. Relatively pure nitrogen or other noncorrosive nitrogen-containing gas are preferred gaseous displacement fluids. This first step of the method of this invention is conducted so as to maintain the liquid petroleum zone essentially unaffected by the gaseous displacement fluid that is injected to "sweep" out the natural gas in the first zone. Additionally, gravitational forces aid in the maintenance of segregated natural gas and gaseous displacement fluid slugs during this natural gas displacement step of the process.

In one embodiment of the method of this invention, the gaseous displacement fluid is injected into the first zone through a well communicating with the first zone at a point at or near the interface between the natural gas and the liquid petroleum-containing zones so as to displace the natural gas upwardly through the first zone to a recovery well communicating with the first zone at a higher elevation. Referring to the drawing, such as "up-dip" displacement could occur by injecting the gaseous displacement fluid through perforations 32a and/or 32b of well 32 so as to displace natural gas upwardly through zone 18 for recovery through perforations 30a of well 30. This up-dip displacement is preferred when the density of the gaseous displacement fluid is greater than the density of the natural gas under the temperature and pressure conditions prevailing in the formation so as to minimize any adverse gravitational effects. Such gravitational effects may include channeling of the gaseous displacement fluid through the natural gas or the undesired gravitationally induced mixing of the natural gas and displacement fluid.

In another embodiment of the method, the gaseous displacement fluid may be injected into the first zone through a well communicating with the first zone at a point near the highest elevation of the first zone so as to displace the natural gas downwardly through the first zone to a recovery well communicating with the first zone at a lower elevation. Referring to the drawing, such "down-dip" natural gas displacement could occur by injecting the gaseous displacement fluid through perforations 30a of well 30 so as to displace the natural gas downwardly for recovery through perforations 32a of well 32 and/or perforations 31a of well 31. This method is preferred when the density of the gaseous displacement fluid is less than the density of the natural gas under the temperature and pressure conditions prevailing in the formation. Due to gravity segregation, the less dense gaseous displacement fluid is less likely to channel through the denser natural gas.

In either of these embodiments, sufficient gaseous displacement fluid is introduced into the first zone so as to displace at least a substantial portion of the natural gas from the first zone for recovery through a recovery well. Typically, gaseous displacement fluid will be injected until the recovery of natural gas becomes uneconomic due to excessive dilution of the natural gas with the gaseous displacement fluid.

After the natural gas has been recovered, an oil-miscible displacement fluid is injected into the formation to displace undrained oil and/or other liquid petroleum to a well for recovery. As used herein, the term "oil-miscible displacement fluid" means a fluid which will miscibly displace liquid petroleum under the temperature and pressure conditions in the formation in the second step of the method of this invention. Suitable oil-miscible displacement fluids include carbon dioxide, nitrous oxide, and sulfur oxides, or mixtures thereof. Relatively pure carbon dioxide or a gas consisting essentially of carbon dioxide is preferred.

In one embodiment of the method of the invention, the oil-miscible displacement fluid is injected through a well communicating with the first zone at or near the highest elevation of the formation under conditions such that it displaces the undrained oil contained in the first zone downwardly to a down-dip well for recovery.

Referring to the drawing, such displacement may occur by injecting the oil-miscible displacement fluid through well perforations 30a of well 30 so as to displace the undrained oil downwardly through first zone 18 for recovery through perforations 32a, 32b, or 32c of well 32 communicating with the formation at or near the interface of zones 18 and 24. Alternatively, in another embodiment the oil-miscible displacement fluid and undrained oil may be displaced through second zone 24 to also recover additional liquid petroleum in the second zone through perforations 33a of well 33.

Preferably, the oil-miscible displacement fluid is injected into the first zone under conditions of temperature and pressure such that, upon fluid contact with the undrained oil and/or other liquid petroleum, the oil-miscible displacement fluid forms a hydrocarbon-enriched fluid which is hereinafter referred to as a "miscible transition fluid." The formation of the miscible transition fluid depends, inter alia, on the temperature and pressure in the formation.

As used herein, the term "miscible displacement pressure" defines the lowest pressure under which the liquid petroleum becomes fully miscible with a particular oil-miscible displacement fluid. The precise value of the miscible displacement pressure will depend upon the composition of the injected fluid, characteristics of the in-place fluids, the formation temperature, and other formation conditions. A discussion of the oil recovery efficiencies of high pressure carbon dioxide flooding and a method for predicting the miscible displacement pressure for carbon dioxide in a particular reservoir are disclosed in "Mechanisms of Oil Displacement by Carbon Dioxide" by L. W. Holm and V. A. Josendal, JOURNAL OF PETROLEUM TECHNOLOGY, December, 1974, the disclosure of which is herein incorporated by reference.

The pressure maintained in the formation during the oil recovery step of this invention is critical to the success of the method. As is known, the presence in a petroleum-bearing formation of various gaseous displacement fluids such as nitrogen, tends to raise the pressure normally required to achieve miscible displacement of liquid petroleum by carbon dioxide or other oil-miscible gas. Accordingly, for any given oil-miscible displacement fluid the minimum pressure required to miscibly displace the liquid petroleum from a given formation would be the miscible displacement pressure in the absence of the gaseous displacement fluid. This minimum pressure is hereinafter referred to as the "miscible displacement pressure in the absence of gaseous displacement fluid". Conversely, the maximum pressure required to miscibly displace the liquid petroleum from a given formation would be that pressure, if any, at which the gaseous displacement fluid itself miscibly displaces the liquid petroleum. This maximum pressure is hereinafter referred to as the "miscible displacement pressure of the gaseous displacement fluid". Generally, it is desirable to use the lowest pressure necessary to achieve miscible displacement under the circumstances. Accordingly, in the method of this invention the formation pressure is preferably maintained at about the minimum pressure (between about the miscible displacement pressure in the absence of gaseous displacement fluid and the miscible displacement pressure of the gaseous displacement fluid) required for miscible displacement of the liquid petroleum. This pressure is usually in the range from about 1.05 times the miscible displacement pressure in the absence of gaseous displacement fluid up to not greater than about 0.8 times the miscible displacement pressure of the gaseous displacement fluid. Preferably, the selected pressure of the invention is in the range from about 1.10 times the miscible displacement pressure in the absence of gaseous displacement fluid and about 0.5 times the miscible displacement pressure of the gaseous displacement fluid. For example, an oil-miscible displacement fluid contacting liquid petroleum and/or undrained oil in the presence of nitrogen according to the method of the invention may form a miscible transition fluid at 4,000 psig, as compared to a required minimum pressure of only 3,500 psig for miscible displacement in the absence of nitrogen and a required minimum pressure of 5,000 psig for miscible displacement by the gaseous displacement fluid itself.

In an embodiment of the method of the invention, the oil-miscible displacement fluid is injected through a well communicating with the pressured first zone at a point near the highest elevation of the formation under conditions such that it forms a miscible transition fluid with the undrained oil contained in the first zone. The miscible transition fluid is displaced downwardly to a downdip well for recovery. The use of a slug of the oil-miscible displacement fluid, driven by a recycled portion of the gaseous displacement fluid may be more economical than continuous injection of the oil-miscible displacement fluid. Such a slug will typically be gravity stabilized at both its trailing and leading interface. At the trailing interface, the density of a gaseous displacement fluid, such as nitrogen, is generally substantially less than the density of an oil-miscible displacement fluid, such as carbon dioxide, and consequently the gaseous displacement fluid would not tend to channel into the oil-miscible displacement fluid. At a typical frontal advance rate of about one foot per day, gravitational forces tend to predominate over viscosity-related forces, such as a tendency of a less viscous fluid to channel through a more viscous preceeding fluid. At the slug's leading interface, the formation of the miscible transition fluid with its higher viscosity tends to substantially reduce the channeling of the oil-miscible displacement fluid that might otherwise result between the relatively low density gaseous displacement fluid located downstructure and the overlying, more dense oil-miscible displacement fluid. Referring to the drawing, the formation and displacement of miscible transition fluid may occur by injecting a slug of oilmiscible displacement fluid, such as carbon dioxide, through perforation 30a of well 30 so as to form a miscible transition fluid with the undrained oil 22 and to displace the miscible transition fluid downwardly through first zone 18 for recovery through perforations 32a, 32b and/or 32c of well 32, communicating with the formation at or near the interface of zones 18 and 24. In another embodiment, the slug could be injected through perforations 31b of well 31 so as to form a miscible transition fluid with the undrained oil 22 contained in the first zone and to displace the miscible transition fluid downwardly through first zone 18 for recovery through perforations 32a, 32b or 32c of well 32, or to further displace the liquid petroleum through second zone 24 for recovery through perforation 33a of well 33. In both of these embodiments, the gaseous displacement fluid previously used to pressurize the formation and recover natural gas may be recovered through perforations 32a of well 32 and recycled through perforations 30a of well 30 to drive the slug of oil-miscible displacement fluid through the formation.

The amounts and locations of undrained oil in the first zone may vary widely, depending, inter alia, upon the homogeneity of the formation and its production history. This data will generally be available to the production engineer so as to enable him to select in view of this disclosure the best wells into which the oil-miscible displacement fluid should be injected to form the miscible transition fluid.

Injection of a gaseous displacement fluid, such as nitrogen, into a subterranean formation for enhanced natural gas recovery by the prior art processes has been known to be subject to several disadvantages. The presence of nitrogen in the formation has been thought to cause a shrinkage of liquid petroleum and increase in its viscosity. Gaseous displacement fluids have been typically injected in such a manner that light and mid-range boiling hydrocarbons are "stripped" from liquid petroleum components in a formation, thereby effectively requiring a higher pressure in order to subsequently miscibly displace the liquid petroleum during any miscible displacement enhanced recovery process. These disadvantages of the prior art processes may however be avoided in the method of this invention by injecting oil-miscible displacement fluid at the opposite end of the formation to that of previously injected gaseous displacement fluid, so as to diminish the stripping effect that gaseous displacement fluid has on the light and mid-range hydrocarbons of connate liquid petroleum during natural gas recovery. Once injected in the formation at an elevated pressure, this oil-miscible displacement fluid contacts the connate petroleum components and forms a miscible transition fluid with an increasing accumulation of these components at its leading interface during advancement towards the recovery wells. Although the invention is not limited to any particular theory of operation, it is believed that the increasing accumulation of the liquid petroleum components at the leading interface of a miscible transition fluid allows the miscible displacement of liquid petroleum at pressures less than would otherwise be expected to be required due to the presence of the gaseous displacement fluid in the formation.

Various modifications may be easily incorporated into the present invention. Modifications include the use of surfactants, such as foaming agents, to assist in mobility control and various preflushing techniques to prepare the formation for one or more steps. Foaming agents introduced into a subterranean formation prior to introduction of oil-miscible displacement fluid may effectively control the mobility of the following fluid and reduce the channeling through the high permeability strata. The use of suitable foaming agents is disclosed in U.S. Pat. Nos. 4,113,011, 4,088,190, 3,529,668, 3,369,601, 3,342,256, 3,335,794, 3,335,792, 3,330,346, 3,323,588, 3,318,379, and 3,311,167, the disclosures of which are herein incorporated by reference.

The preferred injection fluids, carbon dioxide and nitrogen, are not only an especially efficient combination of fluids for the dual injection technique of displacing fluids for recovering natural gas, undrained oil and liquid petroleum, but are also readily produced inexpensively, such as by distilation of air to obtain the necessary nitrogen. The oxygen produced may be used in the combustion of a carbonaceous substance to produce $CO_2$, such as by means of a conventional fire flood in another subterranean oil-bearing formation. For example, air may be distilled with the nitrogen produced being employed as the gaseous displacement fluid in the natural gas recovery step of this invention and with the oxygen being employed to generate relatively pure carbon dioxide for use as the oil-miscible displacement fluid in the liquid petroleum displacement step of the invention.

The invention is further illustrated by the following example which is illustrative of a specific mode of practicing the invention and is not intended as limiting the scope of the appended claims.

EXAMPLE I

Natural gas, undrained oil and liquid petroleum are recovered from a subterranean formation in accordance with the method of this invention. A subterranean formation, substantially as illustrated by formation 10 in the drawing, contains liquid petroleum-containing zone 24 of approximately 100 feet to 200 feet in thickness at a depth ranging from about 7,500 feet to about 7,700 feet. Natural gas and undrained oil-containing zone 18 has an uppermost extension 14 at a depth of about 6,000 feet and extends downwardly to a depth of about 7,500 feet. The uppermost extent of ground water zone 28 is at a depth of about 7,700 feet.

The liquid petroleum and an API gravity of about 33° and the natural gas has a density of 0.09 gms/cc measured at a temperature of 212° F. and a pressure of 1,807 psig.

Wells 30, 31, 32 and 33 are drilled and completed for fluid communication with the subterranean formation 10. Wells 30 and 32 are completed to accommodate both injection and recovery, through perforations 30a, 32a and 32b, respectively, and wells 31 and 33 are completed to accommodate recovery through perforations 31a, 31b, 31c and 33a, respectively.

Gaseous nitrogen having a density of 0.11 gms/cc, and viscosity of 0.023 cp under the reservoir conditions is injected into natural gas-containing zone 18 of formation 10 through perforations 32a and 32b of well 32. Upon continuous injection of nitrogen with the formation pressure maintained at 1,807 psig, the nitrogen forms a displacement bank below the natural gas and gradually displaces the natural gas upwardly for recovery through perforations 31a and 30a of wells 31 and 30, respectively. After further recovery of natural gas becomes uneconomic, the production wells are shut in and nitrogen gas injection is continued until the pressure in the formation reaches a pressure of about 3,500 psig. A pressure of approximately 12,000 psig at these conditions would be required to miscibly displace the undrained oil with nitrogen.

Carbon dioxide, having a density of 0.26 g/cc and viscosity of 0.025 cp is then injected under reservoir conditions into first zone 18 through perforations 30a of well 30. The carbon dioxide forms a fluid bank which advances downwardly through first zone 18 and encounters undrained oil and solubilizes the undrained oil so as to form a miscible transition fluid. Continued injection of carbon dioxide displaces the miscible transition fluid through first zone 18 and into second zone 24 while liquid petroleum is recovered through perforations 31b, 31c, 32a, 32b, 32c and/or 33a of wells 31, 32 and/or 33, respectively.

While particular embodiments of the invention have been described, it will be understood, of course, that the invention is not limited thereto since many obvious modifications can be made, and it is intended to include within this invention any such modifications as will fall within the scope of the appended claims.

Having now described the invention, I claim:

1. A method for the recovery of hydrocarbons from a subterranean formation containing both natural gas and liquid petroleum, said formation having an upper first zone containing said natural gas, said method comprising the steps of:
   (a) introducing a gaseous displacement fluid through a first well communicating with said first zone so as to displace at least a portion of said natural gas from said first zone to a second well and recovering said portion of natural gas through said second well; and
   (b) thereafter introducing an oil-miscible displacement fluid into said formation at a selected pressure so as to displace at least a portion of said liquid petroleum to a recovery well, and recovering said portion of liquid petroleum through said recovery well.

2. The method defined in claim 1 wherein said gaseous displacement fluid is nitrogen or a nitrgen-containing gas.

3. The method defined in claim 1 wherein said oil-miscible displacement fluid is selected from the group consisting of carbon dioxide, nitrous oxide and sulfur oxides.

4. The method defined in claim 1 wherein said second well communicates with said first zone at a position which is at a higher elevation than the position at which said first well communicates with said first zone.

5. The method as defined in claim 4 wherein, at the conditions prevailing in said first zone during step (a), said gaseous displacement fluid has a density greater than or equal to the density of said natural gas.

6. The method defined in claim 4 wherein said first well is in fluid communication with said formation at about the interface between said first zone and an underlying second zone containing liquid petroleum.

7. The method defined in claim 1 wherein said first well communicates with said first zone at a position which is at a higher elevation than the position at which said second well communicates with said first zone.

8. The method defined in claim 7 wherein, at the conditions prevailing in said first zone during step (a), said gaseous displacement fluid has a density less than or equal to the density of said natural gas.

9. The method defined in claim 7 wherein said second well is in fluid communication with said formation at about the interface between said first zone and an underlying second zone containing liquid petroleum.

10. The method defined in claim 1 wherein said subterranean formation has a second zone containing liquid petroleum underlying said first zone and wherein said portion of liquid petroleum recovered during said step (b) includes at least some liquid petroleum from said second zone.

11. The method defined in claim 10 wherein during step (b) said oil-miscible displacement fluid is injected into said second well so as to form a miscible transition fluid with at least a portion of said liquid petroleum.

12. The method defined in claim 11 wherein said method further comprises the step of (c) thereafter injecting a drive fluid through said second well so as to displace at least a portion of said miscible transition fluid to said recovery well.

13. A method as defined in claim 12 wherein said drive fluid comprises at least a portion of said gaseous displacement fluid which has been recovered from said first zone for recycle.

14. The method defined in claim 1 wherein said liquid petroleum comprises undrained oil contained in said first zone and wherein said portion of liquid petroleum recovered during said step (b) includes at least some of said undrained oil.

15. The method as defined in claim 14 wherein during step (b) said oil-miscible displacement fluid is injected into said second well to displace said portion of said undrained oil for recovery through a well which communicates with said formation at a position which is at a lower elevation than the position at which said second well communicates with said formation.

16. The method defined in claim 14 wherein during step (b) said oil-miscible displacement fluid is injected into said second well so as to form a miscible transition fluid with at least a portion of said undrained oil.

17. The method defined in claim 16 wherein said method further comprises the step of (c) thereafter injecting a drive fluid through said second well so as to displace at least a portion of said miscible transition fluid to said recovery well.

18. A method as defined in claim 14 wherein said drive fluid comprises at least a portion of said gaseous displacement fluid which has been recovered from said first zone for recycle.

19. A method for the recovery of natural gas, undrained oil, and liquid petroleum from a dipping subterranean hydrocarbon-containing formation having an updip first zone containing natural gas and undrained oil overlying a second zone containing liquid petroleum, said method comprising the steps of:
   (a) injecting a gaseous displacement fluid through a first well into said first zone so as to displace at least a portion of said natural gas from said first zone to an updip second well and recovering said portion of natural gas through said second well, said gaseous displacement fluid being selected from the group consisting of nitrogen and nitrogen-containing gases and having a density which is greater than or equal to the density of said natural gas under the conditions prevailing in said first zone; and
   (b) thereafter injecting an oil-miscible displacement fluid into said first zone at a selected pressure so as to displace at least a portion of said undrained oil from said first zone and at least a portion of said liquid petroleum from said second zone to a downdip third well and recovering said portions of undrained oil and liquid petroleum through said third well, said oil-miscible displacement fluid being selected from the group consisting of carbon dioxide, nitrous oxide, and sulfur oxides.

20. A method for the recovery of natural gas, undrained oil and liquid petroleum from a dipping subterranean hydrocarbon-containing formation having an updip first zone containing natural gas and undrained oil overlying a second zone containing liquid petroleum, said method comprising the steps of:
   (a) injecting a gaseous displacement fluid through a second well into said first zone so as to displace at least a portion of said natural gas from said first zone to a downdip first well and recovering said portion of natural gas through said first well, said gaseous displacement fluid being selected from the group consisting of nitrogen and nitrogen-containing gases and having a density which is less than or equal to the density of said natural gas under the conditions prevailing in said first zone; and (b) thereafter injecting an oil-miscible displacement fluid into said first zone at a selected pressure so as to displace at least a portion of said undrained oil from said first zone and at least a portion of said liquid petroleum from said second zone to a downdip third well and recovering said portions of undrained oil and liquid petroleum through said third well, said oil-miscible displacement fluid being selected from the group consisting of carbon dioxide, nitrous oxide, and sulfur oxides.

21. The method defined in claim 19 or 20 wherein during step (b) said oil-miscible displacement fluid is injected through said second well so as to form a miscible transition fluid comprised of said undrained oil and said oil-miscible displacement fluid.

22. The method defined in claim 21 wherein following formation of said miscible transition fluid a gaseous drive fluid is introduced through said second well so as to displace said miscible transition fluid through said first zone and at least a portion of said second zone to said third well for recovery.

23. The method defined in claim 22 wherein said gaseous drive fluid comprises at least a portion of said gaseous displacement fluid which had been recovered from said first zone for recycle.

24. The method defined in claim 19 or 20 wherein said first well is in fluid communication with said petroleum at about the interface of said first and second zones.

25. The method defined in claim 1, 19 or 20 wherein said selected pressure is between about the miscible displacement pressure in the absence of the gaseous displacement fluid and the miscible displacement pressure of the gaseous displacement fluid.

26. A method for the recovery of natural gas, undrained oil, and liquid petroleum from a dipping subterranean hydrocarbon-containing formation having an updip first zone containing natural gas and undrained oil overlying a second zone containing liquid petroleum, said method comprising the steps of:

(a) treating air so as to generate (1) a gaseous displacement fluid consisting essentially of nitrogen and (2) an oxidizing fluid consisting essentially of oxygen;

(b) reacting said oxidizing fluid with carbonaceous matter to generate an oil-miscible displacement fluid comprising carbon dioxide;

(c) injecting said gaseous displacement fluid into said first zone through a first well communicating with said first zone near the interface of said first and second zones so as to displace at least a portion of said natural gas from said first zone to an updip second well, and recovering said portion of natural gas through said second well, said gaseous displacement fluid having a density greater than or equal to the density of said natural gas under the conditions prevailing in said first zone;

(d) thereafter injecting at least a portion of said oil-miscible displacement fluid into said first zone at a selected pressure so as to form a miscible transition fluid with at least a portion of said undrained oil, said selected pressure being between about the miscible displacement pressure in the absence of said gaseous displacement fluid and about the miscible displacement pressure of said gaseous displacement fluid;

(e) thereafter injecting a drive fluid into said first zone so as to displace at least a portion of said miscible transition fluid and at least a portion of said liquid petroleum from said second zone to a downdip third well and recovering said portions of liquid petroleum and undrained oil through said third well.

27. The method defined in claim 1, 19, 20 or 26 wherein said selected pressure is between about 0.8 times the miscible displacement pressure of said gaseous displacement fluid and about 1.05 times the miscible displacement pressure in the absence of said gaseous displacement fluid.

28. The method defined in claim 1, 19, 20 or 26 wherein said selected pressure is between about 0.5 times the miscible displacement pressure of said gaseous displacement fluid and about 1.1 times the miscible displacement pressure in the absence of said gaseous displacement fluid.

* * * * *

UNITED STATES PATENT AND TRADEMARK OFFICE
CERTIFICATE OF CORRECTION

PATENT NO. : 4,393,936
DATED : July 19, 1983
INVENTOR(S) : Virgil A. Josendal

It is certified that error appears in the above-identified patent and that said Letters Patent are hereby corrected as shown below:

In column 11, line 28, the last word "petroleum" should be -- formation --.

Signed and Sealed this

Fifteenth Day of November 1983

[SEAL]

Attest:

GERALD J. MOSSINGHOFF

Attesting Officer

Commissioner of Patents and Trademarks